United States Patent [19]

Matsuo et al.

[11] Patent Number: 5,444,342
[45] Date of Patent: Aug. 22, 1995

[54] EMERGENCY STOP CIRCUIT OF TEACHING OPERATION PANEL

[75] Inventors: Yasuhiro Matsuo, Minamitsuru; Yoshiki Hashimoto, Hadano, both of Japan

[73] Assignee: Fanuc Ltd., Minamitsuru, Japan

[21] Appl. No.: 30,275

[22] PCT Filed: Jul. 23, 1992

[86] PCT No.: PCT/JP92/00940
§ 371 Date: Mar. 26, 1993
§ 102(e) Date: Mar. 26, 1993

[87] PCT Pub. No.: WO93/04413
PCT Pub. Date: Mar. 4, 1993

[30] Foreign Application Priority Data

Aug. 15, 1991 [JP] Japan .................. 3-205110

[51] Int. Cl.⁶ .............. G05B 9/02; B25J 9/22
[52] U.S. Cl. .............. 318/563; 318/568.11; 318/568.16; 318/568.24; 901/49
[58] Field of Search .......... 318/563, 565, 568.11, 318/568.16, 568.12, 568.13, 568.21, 568.24; 901/3, 8, 46, 49, 50

[56] References Cited

U.S. PATENT DOCUMENTS 5,079,491  1/1992  Nose et al. ............ 318/568.11
5,115,179  5/1992  Fujii et al. ............. 318/568.13
5,212,433  5/1993  Yasuyuki ............... 318/568.13

FOREIGN PATENT DOCUMENTS 2811905    3/1979  Germany .
60-191301  2/1986  Japan .
64-2887    1/1989  Japan .

*Primary Examiner*—Bentsu Ro
*Attorney, Agent, or Firm*—Staas & Halsey

[57] ABSTRACT

An emergency stop circuit of a teaching operation panel by which the teaching operation panel can be connected to and disconnected from a robot control device under predetermined conditions and the operation of a robot is not stopped even if the teaching operation panel is disconnected from the robot control device. When the robot, which has already been taught and is automatically operated, comes into contact with a connection cable between the teaching operation panel and the robot control device and disconnects the teaching operation panel from the robot control device, the emergency stop function of the robot is effected. When, however, the teaching operation panel is disconnected from a port while a connecting/disconnecting switch is turned ON, the emergency stop function of the robot is not effected. With this arrangement, the teaching operation panel can be disconnected from the robot control device while the robot is automatically operated.

6 Claims, 3 Drawing Sheets

EMERGENCY STOP CIRCUIT OF TEACHING OPERATION PANEL

TECHNICAL FIELD

The present invention relates to an emergency stop circuit of a teaching operation panel for teaching an operation to a robot, and more specifically, to an emergency stop circuit of a teaching operation panel for urgently stopping the operation of a robot in case of an emergency.

BACKGROUND ART

Conventionally, there is a method for an operator to actually teach the sequence of movement and operation of a robot by using a teaching operation panel or the like as a method of teaching an operation to the robot and the like.

The teaching operation panel is provided with an emergency stop switch for urgently stopping the operation of the robot to protect the operator from danger caused by the operation of the robot while a teaching operation is being carried out.

FIG. 3 shows a conventional emergency stop circuit diagram for a robot, including an emergency stop switch disposed on a teaching operation pane 1. The teaching operation panel 51 is comprises a portable robot teaching device disposed such that it can be operated in the vicinity of the robot 52. The teaching operation panel 51 includes an emergency stop switch SW7, dead man switch SW8 and effective/ineffective switch SW9. The emergency stop switch SW7 comprises a normally-closed type push button switch for urgently stopping the operation of the robot 52 prior to the other switches regardless of the operation thereof. The dead man switch SW8 comprises a normally-open type push button switch mounted on the back surface of the teaching operation panel 51 for urgently stopping the robot 52 to secure the safety of an operator in such a manner that when the operator removes his hand from the teaching operation panel 51 and releases the pushed buttons the robot 52 is urgently stopped. The effective/ineffective switch SW9 comprises a changeover switch for making the function of the dead man switch SW8 either effective or ineffective.

The teaching operation panel 51 is connected to a robot control device (not shown) for controlling the operation of the robot 52 through connection cable, and in particular, the emergency stop switch SW7, the dead man switch SW8 and the effective/ineffective switch SW9 of the teaching operation panel 51 are connected to the relay circuit unit 53 in the robot control device. The power supply Vcc of the relay circuit unit 53 is connected to the dead man switch SW8 and effective/ineffective switch SW9 through the emergency stop switch SW7. A relay R1, connected in series to the dead man switch SW8, includes a make contact r1a and a break contact r1b, and a relay R2, connected in series to the effective/ineffective switch SW9, includes a make contact r2a and break contact r2b. Further, a relay R3, connected in series to a plurality of switches SW10–SWn mounted on a safety fence and connected to each other in series, includes two make contacts r3a1 and r3a2.

The three contacts, i.e., break contact r1b of the relay R1, the break contact r2b of the relay R2 and the make contact r3a2 of the relay R3 are connected to each other in parallel (which are tentatively referred to as a first parallel circuit), and the series circuit comprising the make contact r3a1 of the relay R3 and the make contact r2a of the relay R2 is connected in parallel to the make contact r1a of the relay R1 (which are tentatively referred to as a second parallel circuit). Then, the second parallel circuit, the first parallel circuit and a relay R4 are connected in series to each other and further connected to the power supply Vcc of the relay circuit unit 53. The make contact r4a of the relay R4 is disposed between a power source 54 and a brake release circuit 55, and when closed, the make contact r4a actuates the brake release circuit 55 and releases a brake applied to the operation of the robot 52 and thus the robot 52 is in operation. Further, the power supply Vcc of the relay circuit unit 53 is connected to the series circuit comprising the safety fence switches SW10–SWn and relay R3.

In this robot emergency stop circuit, when the dead man switch SW8 of the teaching operation panel 51 is depressed and the effective/ineffective switch SW9 is set to an effective side (the switch is opened), the relay R1 is actuated to close the make contact r1a and the relay R2 is not actuated and thus the break contact r2b is in a closed state. Therefore, the relay R4 is actuated to close the make contact r4a. With this arrangement, power is supplied from the power source 54 to the brake release circuit 55 so that the brake release circuit 55 releases a brake and thus the robot 52 is in operation. In this case, the robot 52 is operated notwithstanding the fact that the safety fence is opened or closed.

Further, when the effective/ineffective SW9 is set to an ineffective side (the switch is closed) and the safety fence is closed (the switches SW10–SWn are closed), the relays R2 and R3 are actuated. Therefore, the make contacts r2a, r3a1 and r3a2 are closed and the relay R4 is actuated. With this arrangement, the make contact r4a is closed and power is supplied from the power source 54 to the brake release circuit 55, and thus the robot 52 is in operation.

In this case, when the safety fence is opened and the switches SW10–SWn are opened, the relay R3 is not actuated and the make contacts r3a1 and r3a2 are opened and thus the operation of the relay R4 is stopped notwithstanding that the dead man switch SW8 is opened or closed. Therefore, the make contact r4a is opened and power is not supplied from the power source 54 to the brake release circuit 55 and thus a brake is applied to the robot 52 to stop the operation thereof.

Note, when the emergency stop switch SW7 is actuated, the relays R1 and R2 are not actuated regardless of the state of the dead man switch SW8 and effective/ineffective switch SW9, and thus the robot 52 is urgently stopped.

As described above, the emergency stop circuit is arranged to protect the operator from danger caused by the operation of a robot while a teaching operation is carried out.

Nevertheless, the aforesaid above-described robot emergency stop circuit is arranged such that when the teaching operation panel 51 is removed from the robot control device and the respective switches SW7, SW8 and SW9 of the teaching operation panel are disconnected from the relay circuit unit 53, the relays R1 and R2 are not actuated, and thus the robot 52 is urgently stopped.

Therefore, a problem arises when the teaching operation panel 51, disposed in the vicinity of the robot 52, is to be disconnected from the robot control device when a teaching operation to the robot has been completed through the teaching operation panel 51. Because the teaching operation panel 51 is not necessary for the automatic operation of the robot 52 after the completion of the teaching operation, it is desired to disconnect the teaching operation panel 51 from the robot control device. However, if the teaching operation panel 51 is disconnected from the robot control device, the robot 52 is urgently stopped.

DISCLOSURE OF THE INVENTION

Taking the above into consideration, an object of the present invention is to provide an emergency stop circuit of a teaching operation panel by which the teaching operation panel can be connected to and disconnected from a robot control device under predetermined conditions and the operation of a robot is not stopped even if the teaching operation panel is disconnected from the robot control device, To attain the above object, according to the present invention, there is provided an emergency stop circuit of a teaching operation panel connected to a robot control device for teaching operation to a robot and having a function for urgently stopping the operation of the robot, which comprises stop means for urgently stopping the robot when the teaching operation panel is disconnected from the robot control device, a manually actuated connecting/disconnecting switch, and prohibiting means for prohibiting the operation of the stop means when the teaching operation panel is disconnected from the robot control device while the connecting/disconnecting switch is turned ON.

During a period when the robot, which has already been taught, is automatically operated, an operator may come into contact with a connection cable between the teaching operation panel and the robot control device and disconnects the teaching operation panel from the robot control device, whereby the emergency stop function of the robot is effected, When, however, the teaching operation panel is disconnected from the robot control device while a connecting/disconnecting switch is turned ON, the emergency stop function of the robot is not effected.

With this arrangement, the teaching operation panel can be disconnected from the robot control device while the robot is automatically operated.

BEST MODE OF CARRYING OUT THE INVENTION

An embodiment of the present invention will be described below with reference to the drawings.

Figure 1:
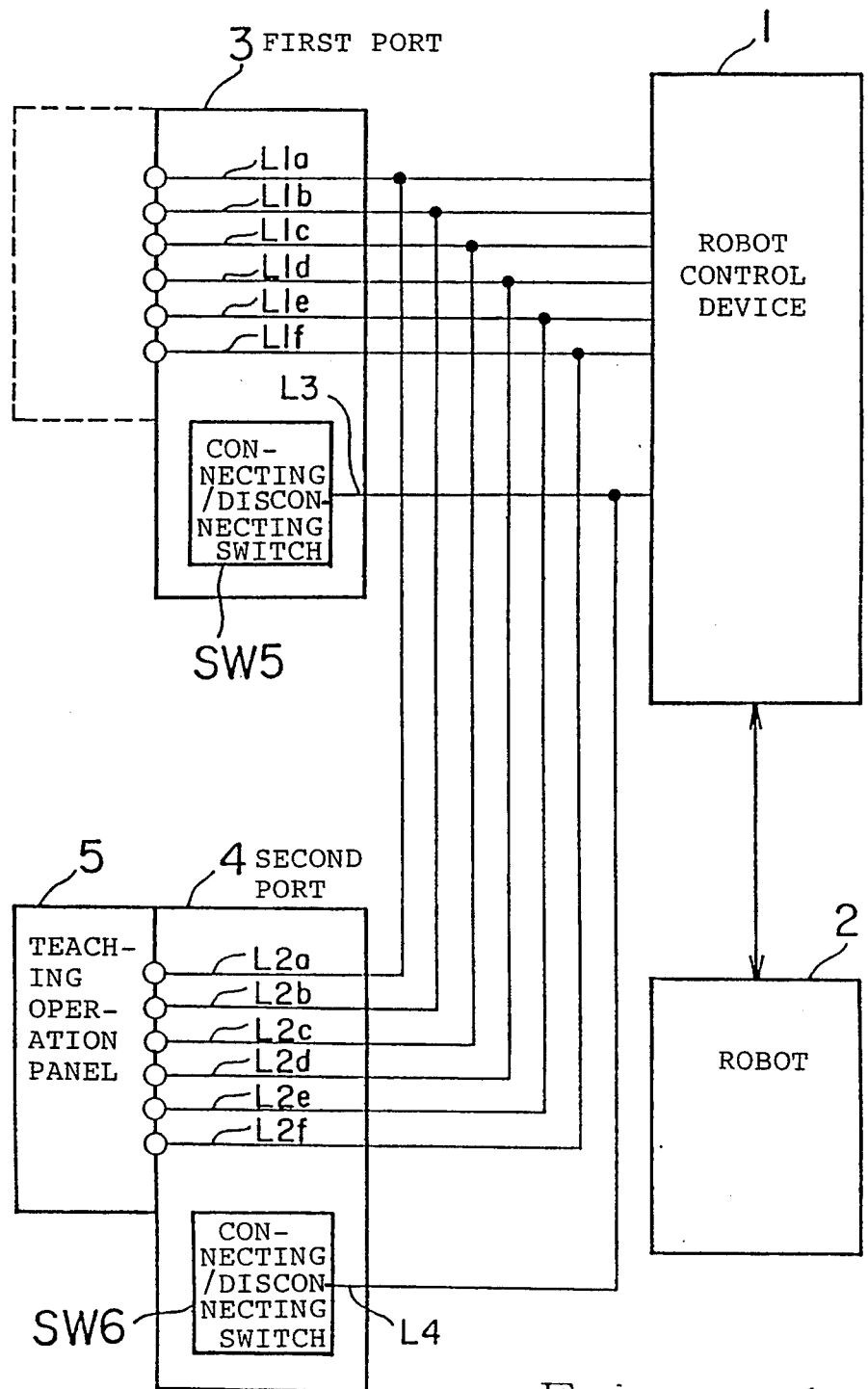
FIG. 1 is a block diagram of a teaching operation panel, robot control device and their peripheral units according to the present invention.

FIG. 1 is a block diagram of a teaching operation panel, robot control device and their peripheral units according to the present invention. A robot 2, a first port 3 and a second port 4 are connected to a robot control device 1 including an emergency stop circuit. The first port 3 and the second port 4 have the same arrangement, as each other and the first port 3 is disposed in the vicinity of or on the robot control device 1 and the second port 4 is disposed in the vicinity of the robot 2. The first port 3 includes a connecting/disconnecting switch SW5 and a plurality of connectors and the second port 4 includes a connecting/disconnectors connecting switch SW6 and a plurality of connectors. A teaching operation panel 5 can be mounted to and dismounted from the first port 3 or the second port 4 through the plurality of connectors.

The first port 3 has respective lines L1a–L1f connected between the teaching operation panel 5 and the robot control device 1 and the second port 4 has respective lines L2a–L2f connected therebetween, and the teaching operation panel 5 transfers a teaching communication signal (L1a, L2a), emergency stop signal (L1c, L1d, L1e and L2c, L2d, L2e) and teaching operation panel connection signal (L1f, L2f) to the robot control device 1 and power (L1b and L2b) is supplied to the teaching operation panel 5. Further, an ON/OFF signal is supplied from the connecting/disconnecting switch SW5 or SW6 to the robot control device 1 through a line L3 or L4, respectively.

Next, the operation of the teaching operation panel, ports, robot control device and the like, arranged as described above, will be described below. First, the teaching operation panel 5 is connected to the second port 4 and carries out a teaching operation to the robot control device 1. This teaching operation is carried out from the second port 4 near to the robot 2, although it may be carried out from the first port 3. An emergency stop function conventionally effected while a teaching operation is performed can be effected regardless of whether the teaching operation panel 5 is connected to the first port 3 or to the second port 4.

Thereafter, the automatic operation of the robot is initiated, and when the teaching operation panel 5, connected to the second port 4, is to be disconnected therefrom white the robot is in the automatic operation, the connecting/disconnecting switch SW6 is turned ON and the teaching operation panel 5 is disconnected in the ON state. The connecting/disconnecting switch SW6 is turned OFF after the teaching operation panel 5 has been disconnected. When the teaching operation panel 5 is disconnected, the emergency stop function is lost except for an emergency stop effected by opening the safety fence, but the robot 2 is continuously operated automatically.

Next, when the teaching operation panel 5 is to be connected to the first port 3, for example, the connecting/disconnecting switch SW5 is turned ON and the teaching operation panel 5 is connected thereto in the ON state and the connecting/disconnecting switch SW5 is turned OFF after the teaching operation panel 5 has been connected. With this arrangement, the connection of the teaching operation panel 5 to the first port 3 is completed.

Figure 2:
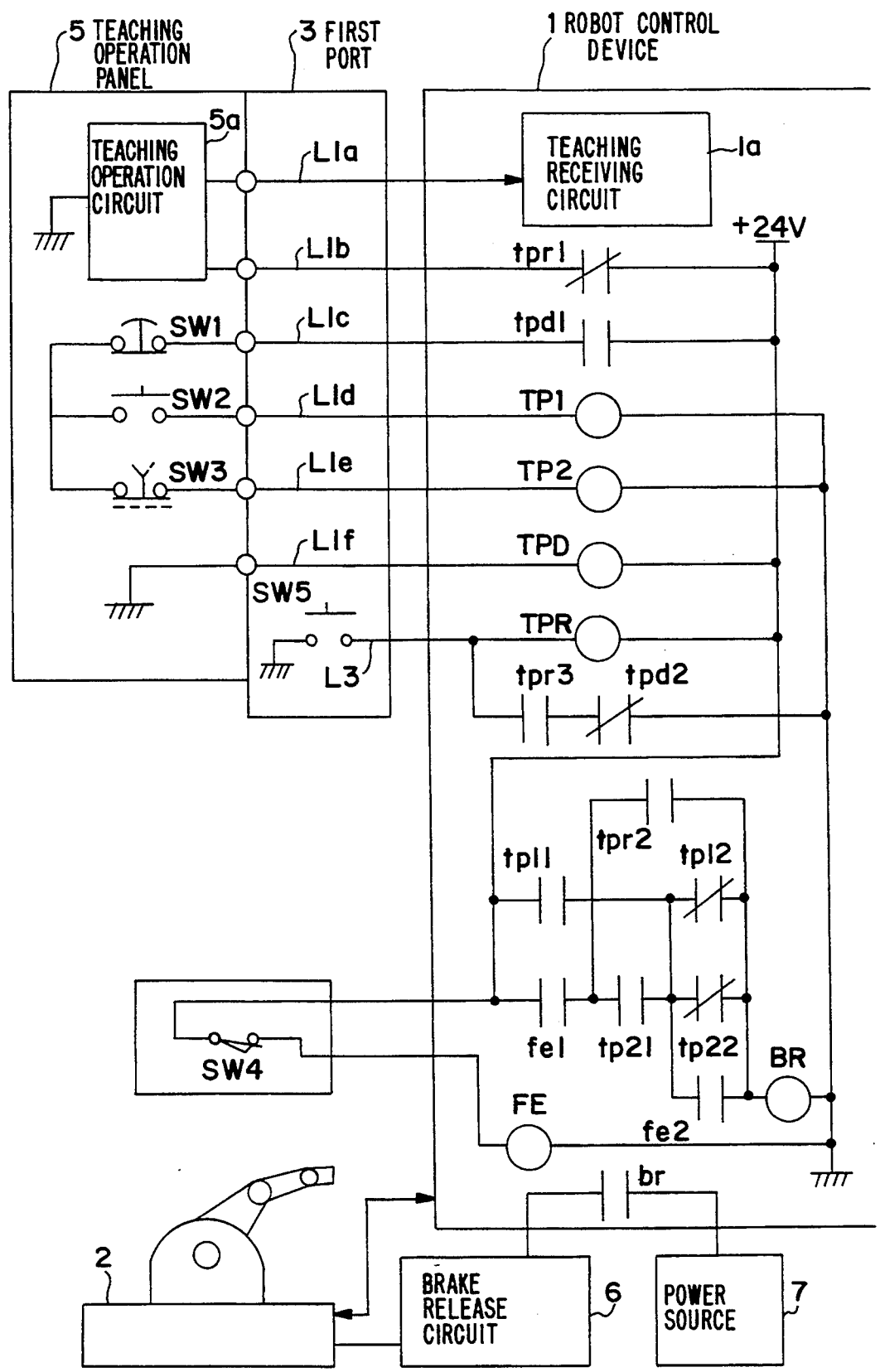
FIG. 2 is a diagram showing a specific circuit arrangement of the teaching operation panel, ports, robot control device and the like shown in FIG. 1.

FIG. 2 is a diagram showing a specific circuit arrangement of the teaching operation panel, ports, robot control device and the like shown in FIG. 1, wherein the second port 4 is omitted and the teaching operation panel 5 is connected to the first port 3 for the simplification of the figure. The same numerals used in FIG. 1 are used in FIG. 2 to designate the same elements and the description thereof is omitted.

Figure 3:
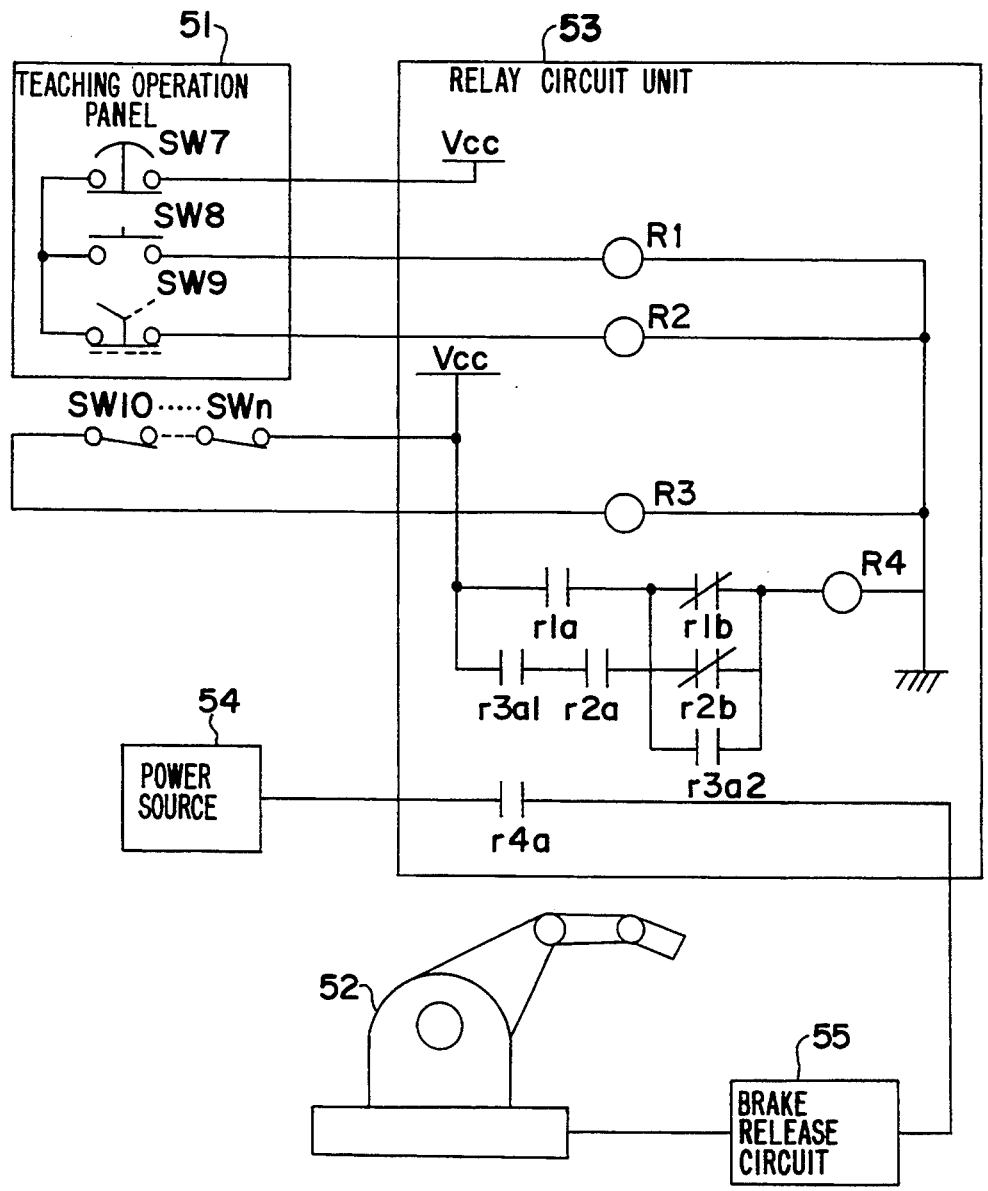
FIG. 3 shows a conventional emergency stop circuit diagram for a robot including an emergency stop switch disposed on a teaching operation panel.

The switches SW1, SW2 and SW3 of the teaching operation panel 5 are the same as the emergency stop switch SW7, dead man switch SW8 and effective/ineffective switch SW9 of the teaching operation panel shown in FIG. 3, respectively, the safety fence switch SW4 corresponds to the safety fence switches SW10-SWn of FIG. 3 and the relays TP1, TP2 and FE of the robot control device 1 are the same as the relays R1, R2 and R3 of the relay control unit 53 shown in FIG. 3, respectively. Further, the make contact tp11 and break contact tp12 of the relay TP1, the make contact fe1 of the relay FE, the make contact tp21 and break contact tp22 of the relay TP2, and the make contact fe2 of the relay FE of the robot control device 1 are the same as the make contact r1a, break contact r1b, make contact r3a1, make contact r2a, break contact r2b, make contact r3a2 of the relay circuit unit 53 of FIG. 3, respectively. Further, the relay BR and make contact br of the robot control device 1 are the same as the relay R4 and make contact r4a of the relay circuit unit 53 of FIG. 3, respectively. Further, the robot 2, a brake release circuit 6 and power source 7 also are the same as the robot 52, brake release circuit 55 and power source 54 of FIG. 3, respectively. Therefore, these same elements are described by using the description in FIG. 3 and the description thereof is omitted here and only the portions different from those of FIG. 3 will be described here.

A teaching operation circuit 5a is provided with the teaching operation panel 5 and a signal output therefrom is supplied to the teaching receiving circuit 1a of the robot control device 1 through the line L1a (the teaching operation panel 5a and teaching receiving circuit 1a are also naturally provided in FIG. 3) and a power supply of +24 V is supplied from the robot control device 1 to the teaching operation circuit 5a through the line L1b and the break contact tpr1 of a relay TPR to be described later. The robot control device 1 has a relay TPD disposed between the power supply of +24 V and the ground of the teaching operation panel 5 through the line L1f and a relay TPR disposed between the power supply of +24 V and the connecting/disconnecting switch SW5 of the first port 3 through the line L3. The robot control device 1 connects the make contact tpd1 of the relay TPD between the power supply of +24 V and the emergency stop switch SW1 of the teaching operation panel 5 through the line L1c, and the series circuit of the make contact tpr3 of the relay TPR and the break contact tpd2 of the relay TPD between the connecting/disconnecting switch SW5 of the first port 3 and the ground through the line L3. Further, the robot control device 1 connects the make contact tpr2 of the relay TPR between the anode of the make contacts fe1 and tp21 and the anode of the make contact fe2 and relay BR.

Next, the operation of the emergency stop circuit of the teaching operation panel arranged as described above will be described. First, while teaching, the relay TPD is actuated to close the make contact tpd1 and thus the switches SW1, SW2 and SW3 are under the same operating conditions as those of the switches SW7, SW8 and SW9 of FIG. 3, respectively. Since the relay TPR is not actuated, the break contact tpr1 is closed and power is supplied to the teaching operation circuit 5a.

Next, when the teaching operation panel 5 is to be disconnected from the first port 3 while the robot 2, which has been taught, operated automatically, the connecting/disconnecting switch SW5 is turned ON. With this arrangement, the relay TPR is actuated to open the break contact tpr1 and the power supplied to the teaching operation circuit 5a is stopped. The break of the teaching operation circuit 5a can be prevented when the teaching operation panel 5 is disconnected in such a manner that the power supplied to the teaching operation circuit 5a is stopped prior to the disconnection of the teaching operation panel 5 from the first port 3.

Then, when the teaching operation panel 5 is disconnected from the first port 3 while the connecting/disconnecting switch SW5 is turned ON, the operation of the relay TPD is stopped and thus the break contact tpd2 is closed in the state that the make contact tpr3 is closed and the relay TPR is continuously actuated regardless of the ON and OFF states of the connecting/disconnecting switch SW5. The connecting/disconnecting switch SW5 is turned OFF after the teaching operation panel 5 has been disconnected. On the other hand, the relays TP1 and TP2 are not actuated by the disconnection of the teaching operation panel 5 from the first port 3 and thus the make contacts tp11 and tp21 are opened and the break contacts tp12 and tp22 are closed.

Since, however, the make contact tpr2 is kept in the closed state while the operation of the relay TPR is maintained, the make contact re1 is closed so long as the safety fence switch SW4 is closed and the relay BR is actuated, and thus the brake release circuit 6 is operated and the robot 2 continues automatic operation. Of course, if the safety fence is opened to turn OFF the safety fence switch SW4, the operation of the robot 2 is urgently stopped.

Next, when the teaching operation panel 5 is to be connected to the first port 3, it is connected to the first port 3 while the connecting/disconnecting switch SW5 is turned ON (at this time, no change is caused to the respective elements of the robot control device 1). Although the relay TPD is actuated by the connection of the teaching operation panel 5 to open the break contact tpd2, the relay TPR is continuously actuated because the connecting/disconnecting switch SW5 is kept in the ON state and the break contact tpr1 is in the open state, Therefore, when the teaching operation panel 5 is connected, the break of the teaching operation circuit 5a can be prevented. Thereafter, the connecting/disconnecting switch SW5 is turned OFF.

The operation of the respective elements which are not described in the above is the same as that of the operation in FIG. 3.

As described above, according to the present invention, when the teaching operation panel is disconnected from the robot control device while the connecting/disconnecting switch is turned ON, it is set in such a manner that the emergency stop function of the robot is not effected, and thus even if the teaching operation panel is disconnected from the robot control device, the automatic operation of the robot is not stopped. During this period, the operation of the safety fence emergency stop switch is effective.

Since the teaching operation panel can be disconnected from the robot control device, the teaching operation panel need not be provided with each robot control device and can be commonly used by robot control devices.

Further, since the ports to be connected to the teaching operation panel can be disposed at a plurality of positions in the vicinity of the robots or robot control devices and the teaching operation panel can be moved between the ports as necessary, the workability of the teaching operation panel can be improved.

Furthermore, since the teaching operation panel can be connected to each port through a minimum length of a cable necessary for the teaching operation of the robot, workability can be improved.

We claim:

1. An emergency stop circuit of a teaching operation panel connected, through a plurality of ports, to a robot control device for teaching operation to a robot and having a function for urgently stopping the operation of the robot, said emergency stop circuit comprising:

stop means for urgently stopping said robot when said teaching operation panel is disconnected from one of said plurality of ports;

manually actuated connecting/disconnecting switches respectively arranged in each port; and prohibiting means for prohibiting the operation of said stop means when said teaching operation panel is disconnected from said one of said plurality of ports and connected to a second one of said plurality of ports while said connecting/disconnecting switches respectively arranged in said one and second one of said plurality of ports are turned ON.

2. The emergency stop circuit of a teaching operation panel according to claim 1, further comprising:

continuing means for continuously operating said prohibiting means even if said teaching operation panel is disconnected from said one of said plurality of ports while said connecting/disconnecting switch arranged in said one of said plurality of ports is turned ON, and then said connecting/disconnecting switch arranged in said one of said plurality of ports is turned OFF.

3. The emergency stop circuit of a teaching operation panel according to claim 1, wherein said prohibiting means prohibits the operation of said stop means when said teaching operation panel is connected to said second one of said plurality of ports while said connecting/disconnecting switch arranged in said second one of said plurality of ports is turned ON.

4. A robot control device for controlling a robot, said robot control device to be used in conjunction with a teaching operation panel which teaches operations to the robot during a teaching mode, said robot control device comprising:

dead man switch means for receiving a force and stopping the robot when the force ceases to be applied;

an effective/ineffective switch means having a first state and a second state and rendering said dead man switch means functionless when said effective/ineffective switch means is in said first state;

an emergency stop switch means having a third state and a fourth state, for stopping the robot regardless of the operation of said dead man switch means and said effective/ineffective switch means when said emergency stop switch is in said third state;

prohibiting means having a fifth state and a sixth state, for preventing said emergency stop switch means from stopping the robot when the teaching operation panel is disconnected from the robot control device and said prohibiting means is in said fifth state; and safety power switch fence means for stopping the robot regardless of the operation of said emergency stop switch means.

5. The robot control device as claimed in claim 4, wherein each of said dead man switch means, said effective/ineffective switch means and said emergency stop switch means comprises a relay including two contacts.

6. The robot control device as claimed in claim 4, wherein said prohibiting means comprises a relay having a break contact and a make contact.

* * * * *

UNITED STATES PATENT AND TRADEMARK OFFICE
CERTIFICATE OF CORRECTION

PATENT NO. : 5,444,342

DATED : August 22, 1995

INVENTOR(S) : Yasuhiro MATSUO et al.

It is certified that error appears in the above-indentified patent and that said Letters Patent is hereby corrected as shown below:

Column 1, line 26, "pane 1" should be --panel--; and line 42, "buttons" should be --button,--.

Column 2, line 58, delete "aforesaid".

Column 3, line 34, after "is" insert --being--;

line 37, "disconnects" should be --disconnect--; and line 39, "," should be --.--.

Column 4, line 1, delete "," after "arrangement" and change "other" to --other,--;

line 6, change "disconnectors" to --disconnecting--;

line 7, delete "connecting"; and line 39, "white" should be --while--.

Column 5, line 41, before "through" insert --3--.

UNITED STATES PATENT AND TRADEMARK OFFICE
CERTIFICATE OF CORRECTION

PATENT NO. : 5,444,342
DATED : August 22, 1995
INVENTOR(S) : Yasuhiro MATSUO et al.

It is certified that error appears in the above-indentified patent and that said Letters Patent is hereby corrected as shown below:

Column 6, line 26, "re1" should be --fe1--; and line 42, "," should be --.--.

Signed and Sealed this

Twenty-eighth Day of November 1995

Attest:

BRUCE LEHMAN

*Attesting Officer*     *Commissioner of Patents and Trademarks*